Sept. 1, 1959 J. V. KEITH 2,901,998
REVOLUTION INDICATING KNOB DEVICE
Filed May 27, 1957
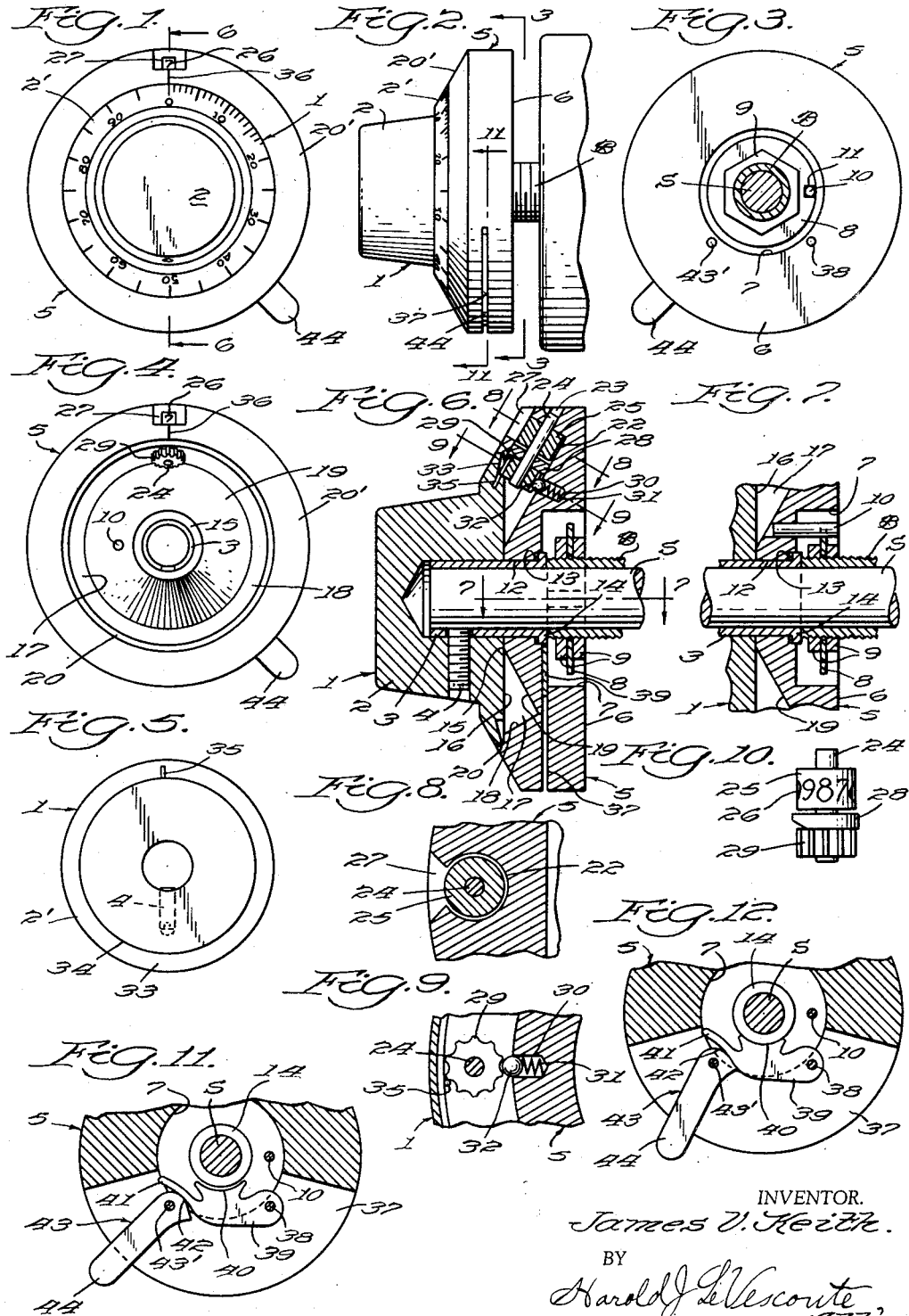
INVENTOR.
James V. Keith.
BY
Harold J. LeVescourte
Atty.

United States Patent Office 2,901,998
Patented Sept. 1, 1959

2,901,998

REVOLUTION INDICATING KNOB DEVICE

James V. Keith, Glendale, Calif.

Application May 27, 1957, Serial No. 661,779

8 Claims. (Cl. 116—115)

This invention relates to dials or knobs for actuating the adjusting shafts or other rotating adjusting elements of instruments or other mechanisms and more particularly to an improved form thereof capable of indicating the extent of movement through a plurality of revolutions and of being locked against movement at any point in its rotation. While in the described embodiment thereof reference is made to the device as an operating means for effecting adjustment, it will be evident that the device is useful also as an indicating medium for indicating the extent to which a shaft or other rotating element to which it is attached may have been rotated by other means.

The principal object of the invention is to provide a knob or dial means attachable to a shaft or other rotating element of an instrument or other mechanism which includes means for indicating the extent of rotation of the element to which it is attached through a plurality of revolutions.

Another object of the invention is to provide a knob or dial for a shaft or other rotating element of an instrument or other mechanism which includes means operable to lock the dial or knob against rotation at any point in its rotative movement.

A further object of the invention is to provide a dial for attachment to a rotating element of an instrument or other mechanism which is sufficiently compact to occupy the space required for the ordinary single rotation dial but which has capacity for indicating the extent of movement through a plurality of revolutions.

Still another object of the invention is to provide a dial means for indicating the movement of a shaft or other rotating element forming a part of the adjusting means for an instrument or other mechanism which is capable of indicating the extent of movement through a plurality of revolutions and which includes releasable locking means operable to lock the dial and the element to which it is connected against rotation at any desired point in its rotations.

A still further object of the invention is to provide a dial or knob means in which the foregoing objectives are realized in practice, which is simple in construction, of few parts, and which is both accurate and reliable for its intended purpose.

With the foregoing objects in view, together with such additional objects and advantages as may subsequently appear, the invention resides in the parts, and in the construction, combination and arrangement of parts, described, by way of example, in the following specification of a presently preferred embodiment of the invention, reference being had to the attached drawings which form a part of said specification and in which drawings:

Fig. 1 is a front elevational view of a dial means embodying the present invention, Fig. 2 is a side elevational view as viewed from the right hand side of Fig. 1, Fig. 3 is a rear elevational view taken on the line 3—3 of Fig. 2, the portion of the apparatus on which the invention is mounted being shown in section, Fig. 4 is a front elevational view with the shaft-attached portion of the device removed to show interior construction, Fig. 5 is a rear elevational view of the shaft-attached component of the device, Fig. 6 is an enlarged medial sectional view taken on the line 6—6 of Fig. 1, Fig. 7 is a fragmentary sectional view taken on the line 7—7 of Fig. 6, Figs. 8 and 9 are further enlarged, fragmentary sectional views of the revolution counting means taken, respectively, on the lines 8—8 and 9—9 of Fig. 6, Fig. 10 is an enlarged side elevational view of the revolution counting means, and Figs. 11 and 12 are fragmentary sectional views taken on the line 11—11 of Fig. 2 and showing the rotation preventing means in released and engaged positions, respectively.

The device is shown as applied to a shaft S of an instrument, said shaft protruding through an externally threaded bushing B. The illustrated embodiment of the invention comprises a knob component 1 having a generally frusto-conical hand grip portion 2 carrying a sleeve 3 which fits over the end of the shaft S and to which it is secured by a set screw 4 threaded into the hand grip portion 2 and extending through a hole in the sleeve and clampingly engaging the shaft S and further having a dial portion 2' extending outwardly from said knob portion. The device includes a stationary component 5 which is generally of the form of a relatively thick disc having a flat rear face 6 which is interrupted by an axially disposed recess 7 which houses a washer 8 mounted on the bushing B and secured thereon by locknuts 9, 9 carried by the bushing B. The bottom of the recess 7 carries a dowel pin 10 which engages a notch 11 in the edge of the washer and thus holds the component 5 from rotating. The component 5 is provided with an axial bore 12 terminating in a counter bore 13 at the juncture with the recess 7, said bore affording bearing support for the stationary component 5 on the sleeve 3 and the counterbore affording clearance for the flange 14 on the end of the sleeve and holding the stationary component from axial movement on the sleeve in one direction, movement in the opposite direction being prevented by engagement between the front face 15 of the stationary component and the rear face 16 of the knob component.

The front face of the stationary component is provided with a groove 17 disposed coaxially with respect to the axial line of the component, said groove being triangular in cross section with respect to the plane of the face 15 and comprising a forwardly divergent side face 18 and an inwardly convergent front face 19 disposed at right angles to the plane of the side face 18. The side face 18 terminates in a shallow counter bore portion 20 in which the edge of the dial portion 2' of the knob component is disposed. Exteriorly of the counter bore 20, the front face of the stationary component extends at a rearwardly divergent angle preferably in the plane of the front face of the said dial portion of the knob component to the outer periphery of the stationary component.

At one point in its surface the side face 18 of the groove 17 is provided with a bore 22 extending at right angles to said face and in a plane radial to the axis of the stationary component, said bore terminating short of the outer periphery of the stationary component and a smaller bore 23 extends in the axial line of the bore 22 from the bottom of said bore to the outer face of the stationary component. Mounted in the bore 23 is one end of a shaft 24 which thence extends toward the axial line of the stationary component, said shaft having fixed thereto and engaging the bottom of the bore 22 a dial element 25 having a series of numerals 26 on the periphery thereof and said numerals being observable through an opening 27 in the front face 20' of the stationary component. Adjacent the opposite end of the dial element, the shaft 24 carries a bearing element 28 closely fitting the bore 22 and beyond the washer the shaft 24 carries a notched wheel 29 fixed thereto having the same number of notches as the numerals on the dial element 25 and disposed in fixed relation thereto. The stationary component also is provided with a bore 30 in the bottom face 19 of the groove 17 in the radial plane of the shaft 24 and in a line extending radially of the notched wheel 29, said bore housing a compression spring 31 seated therein and pressing a detent ball 32 also housed therein against the periphery of the notched wheel 20 and operating to hold it yieldingly against rotation except by step by step movement whereby the numerals will be displayed for observation through the opening 27. The outer portion of the rear face 16 of the knob component terminates in a peripheral groove 33 affording clearance for the notched wheel 29 and the inner face 34 of said groove engages the end of the wheel to hold the wheel and the shaft to which it is affixed against endwise movement. At one point in its periphery, the dial portion of the knob component carries a pin 35 disposed in the plane of the notches in the wheel 29 and parallel thereto effective upon rotation of the knob component with passage of the pin past the wheel to rotate the wheel one notch with resultant indication of the said movement by the appearance of a different numeral in the opening 27. The front face of the dial portion 2' carries graduations which register with a line 36 on the face of the stationary component, said graduations being either indicative either of decimal or degree increments of movement of the dial and knob component relative to the stationary component and each full revolution of the knob component in either direction being accompanied by a corresponding indication thereof by the dial 25. Thus, assuming that the dial 25 is divided into ten positions by having ten notches on the wheel 29 and assuming that the dial portion 2' is graduated into one hundred divisions, the position of the shaft operated by the knob component can be accurately positioned and recorded in 1,000 different positions with resultant capacity of finer adjustment of the portion of the instrument or other apparatus to which the device is attached.

In adjustment of such instruments and apparatus it is also desirable once a particular setting is made to insure that the adjustment will not be disturbed. To that end, the device is provided with a braking means effective to hold it against accidental or other unintended movement. The stationary component is provided with a narrow segmental slot 37 extending from the outer peripheral face thereof into the bottom face of the recess 7 at a point removed from the position of the shaft 24 and the dial and wheel carried thereby. Disposed in the slot 37 and having one end thereof pivotally mounted on a pin 38 at one end of the slot is a brake lever 39 having a concave face 40 adapted to be brought into engagement with the edge of the flange 14. The free end of the lever 39 terminates in a resilient finger 41 adapted to be engaged by the camming face 42 of an operating lever 43 also mounted in the slot 37 outwardly of the finger 41 on a pivot pin 43' and having a handle 44 projecting beyond the periphery of the stationary component. In the position shown in Fig. 11, the brake member is disengaged from the flange 14 and consequently the knob component to which the sleeve and flange are connected is free to turn. When the lever is moved to the position shown in Fig. 12, the brake lever is brought into tight contact with the edge of the flange 14, thus preventing rotation of the knob component until released. It is particularly to be noted that thus locking and releasing the knob component is achieved without any tendency for the knob component to be moved in either direction by reason of this clamping action. Furthermore the locking means is positioned out of the way of accidental operation but at the same time is disposed for convenient usage without necessarily looking for it as when watching some dial or other subject matter while making the desired adjustment by the knob component.

Thus there has been provided a dial mechanism for instrument and apparatus shafts which is readily attachable to such shafts and which increases the sensitivity of adjustment of the apparatus controlled thereby by ten fold. The device is composed of few parts and is of sturdy construction.

While the foregoing specification has disclosed a presently preferred embodiment of the invention by way of example, it is not to be inferred therefrom that the invention is limited to the exact details of the embodiment so disclosed and it will be understood that the invention includes all such changes and modifications in the parts, and in the construction, combination and arrangement of parts as shall come within the purview of the appended claims.

I claim:

1. An actuating knob device attachable to a rotatable adjusting component of an instrument or other apparatus, said device comprising a stationary component and a manually rotatable component supporting and providing bearing means for said stationary component, means carried by said stationary component removably and non-rotatingly engaging the instrument or apparatus and effective by such engagement to prevent rotation of said stationary component, means carried by said rotatable component securing said rotatable component to the adjusting component of the instrument, a rotatable, revolution counting, dial mechanism mounted on said stationary component and rotatable in step by step increments, means carried by said rotatable component engaging said dial mechanism and operative to impart one step of said dial mechanism movement for each traverse of said dial mechanism engaging means past said dial mechanism, and detent means engaging said dial mechanism effective to restrain said dial mechanism against dislodgement between successive traverses thereof by said dial mechanism engaging means; said securing means constituting the sole means required to mount said device on the instrument or apparatus.

2. An actuating knob device as claimed in claim 1 in which said stationary component carries a manually operable brake means operable to lock said rotatable component against rotative movement.

3. An actuating knob device as claimed in claim 1 in which said rotatable component includes a radially extending dial surface having graduations thereon readable against a reference line on said stationary component and in which said dial mechanism includes a dial having an indicia carrying surface viewable through an opening in said stationary component disposed radially outwardly of said reference line.

4. In an actuating knob device attachable to a shaft serving as an adjusting element of an instrument or other apparatus, a rotatable component and a stationary component, said rotatable component comprising a manually graspable knob element having an axially disposed sleeve mounted around over the shaft to be actuated, a set screw carried by said knob element extending through an opening in said sleeve and operable to clampingly engage the shaft to be actuated, said sleeve having a portion extending rearwardly beyond said knob element providing support for said stationary component, said stationary component comprising a disc like element having an axial bore extending therethrough in which said rearwardly extending portion of said sleeve is disposed and said sleeve having a radial flange at its distal end restraining said stationary component against axial movement in one direction and the engagement of the front face of said stationary component with the rear face of said rotatable component serving to prevent axial movement of said stationary component in the opposite direction, a revolution counting means wholly carried by one of said components and means for operating said counting means in step by step increments by rotation of said rotatable component, and means on the rear face of said stationary component engageable with a non-rotative portion of the instrument or apparatus effective to hold said stationary component against rotative movement; said set screw constituting the sole means required to mount said device on the adjusting shaft of the instrument or apparatus.

5. An actuating knob device as claimed in claim 4 in which said stationary component carries a manually operable brake means operable to restrain said sleeve and the shaft to which it is attached against rotation.

6. An actuating knob device as claimed in claim 4 in which said revolution counting means is carried by said stationary component and comprises a rotatable dial mechanism operable in step by step increments and including a dial carrying indicia from which the number of revolutions of said rotatable component may be determined.

7. An actuating knob device as claimed in claim 4 in which said stationary component is provided with a slot at one side extending in a plane normal to the axial line of rotation of said rotatable component from the periphery thereof to said bore and in which said stationary component is provided with manually operable brake means disposed in said slot comprising a brake element having one end thereof pivotally mounted on said stationary component and having a curved edge surface adapted to engage said sleeve intermediate the ends of said brake element, the free end of said brake element terminating in an arm portion, and a cam lever disposed in said slot and pivotally mounted in said stationary component having a camming surface engageable with said arm within said slot and having a handle portion extending out of said slot beyond the periphery of said stationary component, said cam lever being operable to move said brake lever to bring said curved edge surface in tight frictional engagement with said sleeve with resultant locking of said sleeve and the shaft to which it is connected against rotation.

8. A knob actuating device as claimed in claim 6 which comprises a shaft journaled in said stationary component adjacent the outer periphery thereof and in a plane extending radially of the axial line of said stationary component, a dial mounted on said shaft and having a surface bearing indicia indicative of the number of revolutions made by said rotatable component, an opening in the front face of said stationary component through which said indicia may be observed, a toothed wheel fixed to said shaft and having a tooth for each indicia character on said dial, detent means engaging said wheel effective yieldingly to hold said wheel against rotative movement, and a member carried by said rotatable component effective to engage said toothed wheel incident to movement past it and operative to move said wheel one tooth against the yielding opposition of said detent means at each excursion of said member past said wheel with resultant change in the character displayed by said dial in said opening.

References Cited in the file of this patent
UNITED STATES PATENTS

| | | |
|---|---|---|
| 2,717,737 | Hoelscher | Sept. 13, 1955 |
| 2,746,417 | McCord et al. | May 22, 1956 |
| 2,805,636 | Smith | Sept. 10, 1957 |